United States Patent [19]
Scrimpshire et al.

[11] Patent Number: 5,631,443
[45] Date of Patent: May 20, 1997

[54] INTERFERENCE SUPPRESSING CABLE BOOT ASSEMBLY

[76] Inventors: James M. Scrimpshire, 141 Fairmont, Pearl, Miss. 39208; Rudolph D. Sullivan, Jr., 475 Pineview La., Brandon, Miss. 39042

[21] Appl. No.: 453,754

[22] Filed: May 30, 1995

[51] Int. Cl.⁶ .................................................. H05K 9/00
[52] U.S. Cl. .................... 174/35 R; 174/35 C; 174/36
[58] Field of Search ............................. 174/36, 35 C, 174/35 R, 92

[56] References Cited

U.S. PATENT DOCUMENTS

| | | | |
|---|---|---|---|
| 3,089,915 | 5/1963 | Plummer | 174/36 |
| 3,750,084 | 7/1973 | Gardner | 339/61 R |
| 4,173,385 | 11/1979 | Fenn et al. | 339/177 E |
| 4,477,693 | 10/1984 | Krabec et al. | 174/36 |
| 4,540,230 | 9/1985 | Iversen et al. | 339/89 M |
| 4,605,274 | 8/1986 | Ichikawa | 339/89 R |
| 4,647,714 | 3/1987 | Goto | 174/36 |
| 4,749,822 | 6/1988 | Klein | 174/36 |
| 4,869,679 | 9/1989 | Szegda | 439/272 |
| 5,083,943 | 1/1992 | Tarrant | 439/583 |
| 5,127,843 | 7/1992 | Henry et al. | 439/320 |
| 5,186,655 | 2/1993 | Glenday et al. | 439/583 |
| 5,281,651 | 1/1994 | Arjnan et al. | 524/519 X |
| 5,539,148 | 7/1996 | Konishi et al. | 174/35 R |

*Primary Examiner*—Kristine L. Kincaid
*Assistant Examiner*—Chau N. Nguyen
*Attorney, Agent, or Firm*—Pravel, Hewitt, Kimball & Krieger

[57] ABSTRACT

A flexible cable boot for external installation around a cable connector of the type being coaxial, triaxial, copper twisted pair, or fiber optic in nature. The cable boot would include a flexible, closely fit external sleeve having a compressive end for supporting a cable against excessive flexing and having on its second end an inwardly extending disc, deformable so that it can be screwed onto the external threads of a connector to form a seal, and including an internal shield to prevent EMI leakage radiation. The product would further include a main body of EDPM (ethylene-propylene diene monomer) material which is ozone resistant. Contained within the body of the cable boot would be provided a foil/film/foil shielding tape of aluminum polypropylene aluminum bonded to the inner wall of the cable boot body with an adhesive material. The assembly is especially suitable for enclosing and protecting cable television coaxial connectors which would be mounted outside of a building such as on a pole or at a distribution splitter outside of a home.

14 Claims, 1 Drawing Sheet

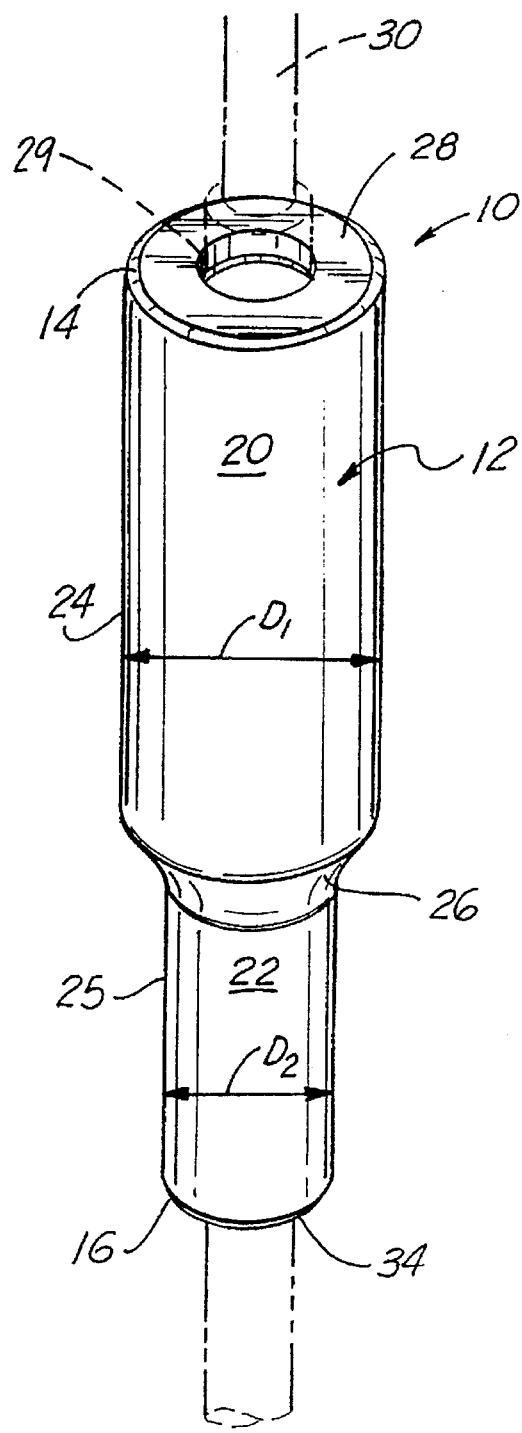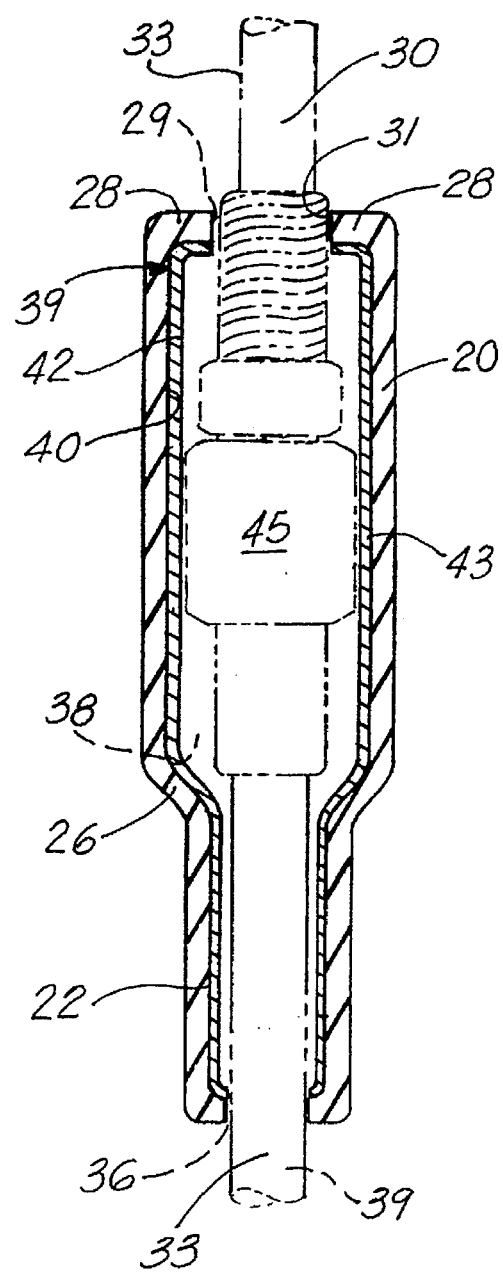
FIG. 1
FIG. 2

INTERFERENCE SUPPRESSING CABLE BOOT ASSEMBLY

BACKGROUND OF THE INVENTION

1. Field Of The Invention

The present invention relates to external sealing boots for enclosing and protecting various types of cable connections from environmental hazards and signal leakage.

2. General Background

In the field of telecommunications systems, signal leakage is a very undesirable emission (egress) of radio frequency or digital signals from within cable/connector interfaces and equipment utilized to carry the signals within telecommunications systems. Within the shielded space of the cable/connector interface and equipment, is the area in which the electromagnetic waves occur. If the shielding which is afforded in such a system is not efficient, or fails to prevent leakage, then some portion of these signals can leak out into the atmosphere. If such leakage is sufficiently severe, it will have the ability to blank out radio receivers, interfere with aircraft navigation systems, and interfere with other communication reception such as television.

On the other hand, if signal leakage occurs and is able to egress from the cable/connector interface, such signals can also enter or ingress thereinto. Therefore, there is a potential for over-the-air frequencies to penetrate into the cable/connector interface through such ingress. The most common causes for ingress is at the cable/connector interface, which is normally due to poor installation from home owners and the telecommunication personnel such as installers or technicians, and may be due to environmental conditions which may cause connectors to work themselves loose and allow ingress and egress of such signals.

The Federal Communications Commission (FCC) requires, in most cases, a signal leakage control program. Such a program is undertaken by routine monitoring and cumulative leakage index (CLI). In most cases, the cable/connector interface is the source of the signal leakage. Due to the problems associated with the interface, there is a major need to improve the RF and digital signals. There are several patents which have been found in the art, which address cable/connectors, to attempt to prevent water or other type of fluid flow into the connector. The most pertinent of the patents are as follows:

U.S. Pat. No. 4,173,385 issued to Fenn, et al. discloses a component of an overall claimed water-tight cable connector, a flexible boot having inner ribs along an extended end to seal to the outer sheath of a cable. The patent describes at the other end a lip engaging a flange on the collar of the connector to provide a water-tight seal.

Other patents disclose components that are integral to coaxial connectors.

U.S. Pat. No. 5,186,655 issued to Glenday, et al., discloses a connector in which the jacket of the coaxial cable is deformed to anchor and seal the connector.

U.S. Pat. No. 5,127,843, issued to Henry, et al., discloses as part of an integral connector, a connector having an insulated outer coupling shell covering an internal conductive shield or shell.

U.S. Pat. No. 4,540,230, issued to Iversen, et al., claims a connector which includes the use of O-rings or similar graphite seals and telescoping sleeves to provide for a sealed, insulated outer covering for the connector.

U.S. Pat. No. 4,605,274, issued to Ichikawa, discloses a connector having a hermetically sealed construction, and, further, having an internal construction within which the electrically connected elements which can move with respect to one another.

U.S. Pat. No. 4,869,679, issued to Szegda, discloses as part of a connector assembly, a stepped resilient sealing element clamped at one end to the connector and at the other end to the cable. See particularly FIG. 4, item 30 showing that the end of the sealing boot includes a circular lip which is received in an external circular recess in the cable sealing element.

U.S. Pat. No. 5,083,943, issued to Tarrant, discloses a CATV F connector in which a compressible gasket and a separator O-ring are claimed to provide continued shielding and weather-proofing for the connector.

U.S. Pat. No. 3,750,084, issued to Gardner, discloses as part of an external cap or boot on a high-tension connector, internal threads on the boot. These internal threads engage external threads on the connector to provide for sealing. Note that the seal must not be complete as a resilient O-ring, as additionally required, and that the O-ring, not the boot, forms the actual fluid tight seal.

In spite of the art cited, there continues to be the need for a product which can enhance the life of the cable/connector interface while together having certain mechanical and electrical benefits not found in the art.

SUMMARY OF THE PRESENT INVENTION

The assembly or apparatus of the present invention solves the problem in a simple and straight forward manner. What is provided is a flexible cable boot for external installation around a cable connector of the type being coaxial, triaxial, and copper twisted pair or fiber optic in nature. The cable boot would include a flexible, closely fit external sleeve having a compressive end for supporting a cable against excessive flexing and having on its second end an inwardly extending disc, deformable so that it can be screwed onto the external threads of a connector to form a seal, and including an internal shield to prevent EMI leakage radiation. The product would further comprise a main body of EPDM (ethylene-propylene diene monomer) material which is ozone resistant. Contained within the body of the cable boot would be provided a foil/film/foil shielding tape of aluminum polypropylene aluminum bonded to the inner wall of the cable boot body with an adhesive material. The assembly is especially suitable for enclosing and protecting cable television coaxial connectors which would be mounted outside of a building, such as on a pole or at a distribution splitter inside or outside of a home.

Therefore, it is the principal object of the present invention to provide a flexible cable boot assembly which provides environmental protection against temperature, wind, salt, ice, moisture, corrosion or the like;

It is a further principal object of the present invention to provide a flexible cable boot assembly which helps to prevent connectors from becoming disconnected from one another;

It is a further principal object of the present invention to provide a flexible cable boot assembly which would be utilized for protecting and shielding an in-line splice, against temperature, wind, salt, ice, moisture, corrosion or the like;

It is the further object of the present invention to provide a flexible cable boot, which may be utilized on splices on splitters, taps and ground blocks, for each connector or cable interface found therein.

It is a further object of the present invention to provide a flexible cable boot, which in addition to protecting against environmental concerns, has the ability to shield against EMI leakage radiation and to prevent ingress or egress of radio signals from within the confines of any coaxial, triaxial, copper twisted pair or fiber optic cables or into the cable coupling assembly.

BRIEF DESCRIPTION OF THE DRAWINGS

For a further understanding of the nature and objects of the present invention, reference should be made to the following detailed description taken in conjunction with the accompanying drawings, in which like parts are given like reference numerals, and wherein:

FIG. 1 is an overall perspective view of the preferred embodiment of the apparatus of the present invention; and FIG. 2 is an overall cross-sectional view of the preferred embodiment of the apparatus of the present invention.

DETAILED DESCRIPTION OF THE PREFERRED EMBODIMENT

FIGS. 1 and 2 illustrate the preferred embodiment of the apparatus of the present invention by the numeral 10. What is provided is an interference-suppressing cable boot assembly 10 comprising an elongated assembly body 12 having a first end portion 14 and a second end portion 16. In the preferred embodiment, body portion 12 would be comprised of an ethylene-propylene diene monomer rubber, which would be ozone resistant. The rubberized body 12 would include an upper body portion 20, and a lower body portion 22. Upper body portion 20 would comprise a continuous annular wall portion 24, defining an overall diameter D1, and lower body portion 22 would include a continuous annular wall portion 25, defining a reduced diameter D2. There would be included an annular beveled surface 26, interconnecting the upper body wall 24 and the lower body wall 25 for defining the entire length of body portion 12. At the upper or first end 14 of body portion 12, there would be included a flexible ring member 28, having a reduced annular opening 29, through which a first coaxial cable 30 would be inserted therethrough. Likewise, the lower end 16 of the lower body portion 22 would include a circular end portion 34, having also a reduced diameter opening 36, through which a second coaxial cable 39 would be inserted. Between the two end portions 14, 16, there would be defined an internal space 38 wherein the connection between cable 30 and cable 39 would be housed within the apparatus 10, identified as connection assembly 45 in FIG. 2.

As seen further in FIG. 2 of the drawings, the continuous annular wall portions 24 and 25 would include an inner surface 40, which would define the interior wall of internal space 38 of the body portion 20. There would be provided a lining means 39 on the inner surface 40 of the body portion 20, extending from the first upper end 14 to the second lower end 16. This lining means would comprise a thin metal shield 42 comprised preferably of an aluminum tape material, such as aluminum polypropylene aluminum-bonded tape 43, which would define the continuous shield 42 housed along the interior surface of internal space 38 within body member 20. Additionally, this shield 42 would be provided along both the inner surface of upper ring member 28, and the inner surface of lower ring member 34. Therefore, the entire connection assembly 45 between cables 30 and 39 are housed within the internal space 38 of body portion 20, surrounded by the shield 42, which comprises aluminum polypropylene aluminum-bonded tape 43. This would insure that any interference from EMI radiation or the like, would be shielded by the aluminum polypropylene aluminum-bonded material 43, and would resist both ingress and egress of such signals while the apparatus was in use. For purposes of further functioning, the upper reduced opening 29 would be a flexible opening which would accommodate the diameter of the cable 30 inserted therethrough, but would provide a water-tight seal between the interior edge 31 of opening 29 and the outer wall 33 of cable member 30. Likewise, the lower end 34 would provide such a water-tight seal through opening 36 and the wall 33 of cable 39 inserted therethrough.

Through the combination of the rubberized ethylene-propylene diene monomer exterior rubberized material in combination with the aluminum polypropylene aluminum-bonded shield housed therein, together they would define a means which in combination provides both environmental and radiation leakage protection for cable connectors housed therein.

The following table lists the part numbers and part descriptions as used herein and in the drawings attached hereto.

| PARTS LIST | |
|---|---|
| Description | Part No. |
| assembly | 10 |
| assembly body | 12 |
| first end portion | 14 |
| second end portion | 16 |
| upper body portion | 20 |
| lower body portion | 22 |
| annular wall portion | 24 |
| annular wall portion | 25 |
| diameter | D1 |
| diameter | D2 |
| annular beveled surface | 26 |
| flexible ring member | 28 |
| annular opening | 29 |
| first coaxial cable | 30 |
| interior edge | 31 |
| outer wall | 33 |
| end portion | 34 |
| reduced diameter opening | 36 |
| second coaxial cable | 39 |
| internal space | 38 |
| inner surface | 40 |
| metal shield | 42 |
| aluminum polypropylene aluminum-bonded tape | 43 |
| connection assembly | 45 |

For purposes of this invention, it should be noted that the use of the invention in interconnecting first and second coaxial cable is but one use. For example, in the preferred embodiment, the use of the apparatus would in general, be utilized for protecting and shielding an in-line splice. For example, the apparatus could be used on splitters, taps and ground blocks and for each splitter, tap or ground block, may require one boot assembly for each connector or cable interface. For example, a tap uses four assemblies, a splitter may utilize three assemblies, and a ground block would utilize two boot assemblies.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An assembly for preventing electromagnetic interference in cable connections, comprising:

a) a generally flexible one-piece assembly body, having first and second end portions;

b) each of said end portions having an opening therethrough for accommodating a first cable connecting to a connector, the end portions forming a seal between the assembly body and the first cable and the connector;

c) a cavity within the assembly body for housing the connection between said first cable and said connector;

d) a metal-based lining positioned along an interior surface of a wall of the assembly body within the cavity for preventing ingress and egress of radiation from the connection between said first cable and said connector.

2. The assembly in claim 1, wherein the assembly body comprises a generally flexible EPDM rubber.

3. The assembly in claim 1, wherein the metal-based lining comprises an aluminum polypropylene aluminum layer secured to the interior surface of the body wall.

4. The assembly in claim 1, wherein the opening at each of said end portions forms a water-tight compressible fit between at least the assembly body and the connector and the first cable.

5. The assembly in claim 2, wherein the flexible EPDM rubber in ozone-resistant.

6. The assembly in claim 1, wherein the first cable may be from a group selected from coaxial, triaxial or fiber optic cables.

7. A removable assembly for preventing electromagnetic interference in cable connection, comprising:

a) a generally flexible rubber-based composite assembly body, having first and second end portions, each of said end portions having an opening therethrough for accommodating a first cable connected to a connector therethrough and forming a water-tight seal between the assembly body and the first cable connected to the connector;

b) a cavity within the assembly body for housing a connection between said first cable connected to said connector;

c) an aluminum-based metal lining positioned along an interior surface of a wall of the assembly body within the cavity for preventing electromagnetic leakage and out of the connection between said first cable and said connector.

8. The assembly in claim 7, wherein the assembly body comprises a generally flexible EPDM rubber.

9. The assembly in claim 7, wherein the aluminum based metal lining is adhesively secured to the interior surface of the body wall.

10. The assembly in claim 7, wherein the opening at each of said end portions forms a compressible connection between the first cable connected to the connector and the assembly body which is resistant to water or other environmental hazards.

11. The assembly in claim 8, wherein the flexible EPDM rubber is ozone-resistant.

12. The assembly in claim 7, wherein the first cable may be from a group selected from coaxial, triaxial, copper twisted pair or fiber optic.

13. An assembly for preventing electromagnetic interference in a cable connection, comprising:

a) a generally flexible one-piece assembly body having first and second end portions, and a bore therethrough, said body slidably engagable over the cable connection;

b) at least one of said end portions forming a compressible seal between the assembly body and the cable connection when the assembly is slidably engaged around the cable connection;

c) a cavity within the assembly body for housing the cable connection sealed within the assembly body; and d) a metal-based lining positioned along an interior surface of a wall of the assembly body within the cavity for preventing ingress and egress of radiation to the cable connection sealed within the assembly body.

14. The assembly in claim 13, wherein the assembly would further comprise a second end forming a compressible seal against said cable connection.

* * * * *